United States Patent [19]

Yamasaki et al.

[11] 3,940,986
[45] Mar. 2, 1976

[54] FLOW VELOCITY MEASURING DEVICE

[75] Inventors: Hiroo Yamasaki; Ichizo Ito; Yukitake Shibata, all of Musashino, Japan

[73] Assignee: Yokogawa Electric Works, Ltd., Tokyo, Japan

[22] Filed: Apr. 22, 1975

[21] Appl. No.: 570,363

[30] Foreign Application Priority Data
Apr. 30, 1974  Japan.............................. 49-49111

[52] U.S. Cl............................................. 73/194 VS
[51] Int. Cl.²......................................... G01F 1/32
[58] Field of Search.................... 73/194 A, 194 VS

[56] References Cited
UNITED STATES PATENTS

| | | | |
|---|---|---|---|
| 3,756,078 | 9/1974 | Yamasari et al. | 73/194 |
| 3,788,141 | 1/1974 | Blackwell | 73/194 |

*Primary Examiner*—Herbert Goldstein
*Attorney, Agent, or Firm*—Parmelee, Johnson & Bollinger

[57] ABSTRACT

A flow metering apparatus of the type having a vortex generating element with a generally elongate cylindrical shape placed in a stream of flowing fluid in a pipe so as to produce Karman's vortices at a rate proportional to the velocity of the flowing fluid, with ultrasonic means for detecting the rate of production of vortices to give a linearly related measure of fluid velocity. To improve the sensitivity of detection, especially at low velocities, the element is formed with a passageway transverse to the stream to produce therein an alternating fluid flow corresponding to the alternating shedding of vortices, and an ultrasonic generator and an ultrasonic receiver are positioned on opposite sides of the element so that the ultrasonic signal generated will be propagated through the passageway in the element and will be modulated by the alternating fluid flow therein. Further improvement of detection sensitivity is attained by mounting the cases housing the ultrasonic generator and receiver to the pipe carrying the flowing fluid with elastic O-rings, and with a mounting means positioned at the vibratory nodes of the cases, to reduce transmission of sounds to and from the pipe. Flow deflecting projections on the inner wall of the pipe are positioned downstream from the vortex generating element to control vortex generating conditions and improve detection.

21 Claims, 15 Drawing Figures

U.S. Patent   March 2, 1976   Sheet 1 of 3   3,940,986
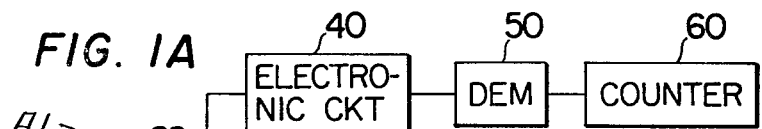
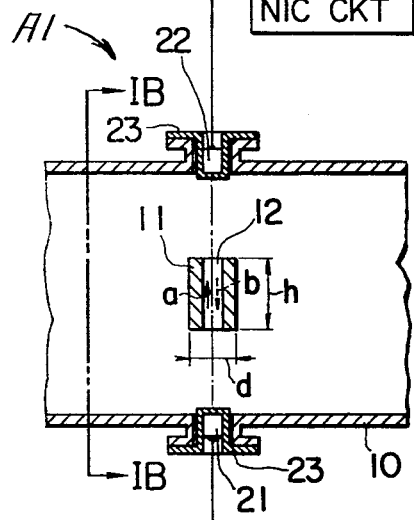
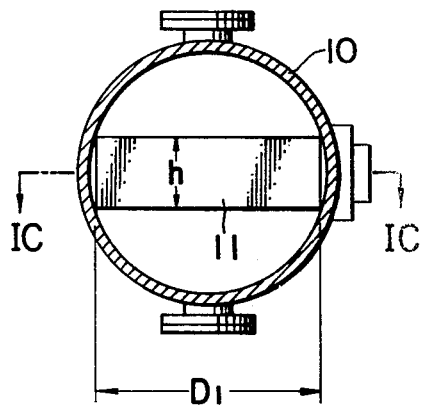
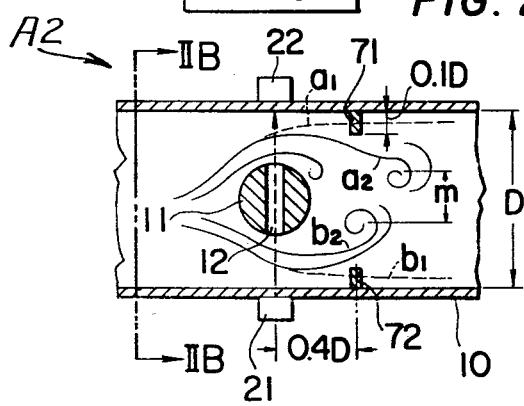
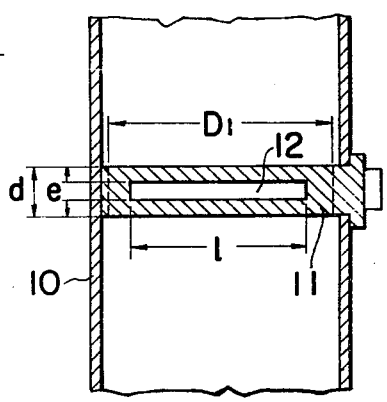
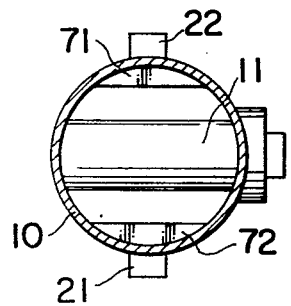

FLOW VELOCITY MEASURING DEVICE

BACKGROUND OF THE INVENTION

1. Field of the Invention

This invention relates to flow-velocity measuring apparatus of the type wherein a cylindrical object in a stream of flowing fluid produces a wake including a distinct pattern of vortices known as the Karman vortex street, and wherein the rate of production of vortices is detected ultrasonically. The vortices are shed alternately from opposite sides of the object in a periodic manner. There is a definite relationship between the frequency f of shedding of the vortices, the velocity v of the stream, and the height h of the object in the direction transverse to the direction of the stream of flowing fluid, expressed by:

$f = Kv/h$ where K is a constant for flow within a range of velocities. Within this range, it is possible to determine the flow velocity $v$ by measuring the frequency $f$ of the generation of vortices.

More particularly, this invention relates to ultrasonically detecting the generation of vortices by making use of the vortex property of oppositely directed velocity components to frequency-or pulse-modulate an ultrasonic signal propagated across the flowing fluid in which the vortices are generated.

2. Description of the Prior Art

Various arrangements have been proposed for ultrasonically detecting the rate of production of Karman's vortices. In one such arrangement, disclosed in U.S. Pat. No. 3,680,375 to Robert D. Joy and in U.S. Pat. Nos. 3,693,438 and 3,756,078 to Hiroo Yamasaki, et al, an ultransonic generator and receiver are positioned downstream from a vortex generating element to propagate an ultrasonic signal transversely through the vortex street trailing from the element. The ultrasonic signal is frequently modulated by the passage of Karman's vortices. This signal is demodulated to yield a signal varying with the rate of production of Karman's vortices.

In another prior art arrangement, disclosed in Japanese Patent Office Prepublication no. 48-30961, an ultrasonic signal is propagated along a stream in front of a vortex generation element and is modulated by fluid flow developed in front of the vortex generation element in correspondence with the production of vortices downstream therefrom.

Such prior art apparatus of the general type referred to above has not been fully satisfactory under certain conditions of flow. For example, at low flow velocities, noise components of flow begin to approach in significance the signal components of alternating flow caused by vortex production, and accurate measurement becomes difficult because the ultrasonic signal is modulated by the turbulence and noise in the flowing fluid. Accordingly, insufficient flow measurement sensitivity is available over a wide range of flow velocities.

SUMMARY OF THE INVENTION

A principal object of the present invention is to provide a flow velocity measuring device with improved sensitivity of detection of vortex production. It is a specific object of the invention to provide a flow velocity measuring device relatively unaffected by turbulence in the flowing fluid being measured and capable of maintaining a linear relationship between flow velocity and the frequency of vortex generation over a wide range of flow velocities. Still another object of the invention is to provide a flow velocity measuring device capable of measuring flow velocities through ultrasonic signals transmitted and received with high efficiency.

In a preferred embodiment of the invention to be described hereinbelow in detail, the vortex generation element is formed with transverse passageway means to produce therein a stable alternating fluid flow corresponding to the alternating shedding of vortices. An ultrasonic generator and an ultrasonic receiver are mounted on opposite sides of the element and passageway means so that the ultrasonic signal is propagated through the passageway means to be modulated by the stable alternating fluid flow therein. This arrangement is less susceptible to interference from noise, and provides improved sensitivity.

In further aspects of the invention, the cases housing the ultrasonic generator and receiver are mounted to the pipe carrying the flowing fluid at the vibratory nodes of the cases to reduce the transmission of vibration. Transmission of vibration is also reduced in an arrangement mounting the cases to the pipe through O-rings made of an elastic material. In a further aspect of the invention, projections mounted in the pipe downstream from the vortex generation element control flow and improve sensitivity.

Other objects, aspects and advantages of the invention will be pointed out in, or be apparent from, the detailed description hereinbelow, considered together with the following drawings.

DESCRIPTION OF THE DRAWING

FIG. 1A is a longitudinal cross-sectional view of flow metering apparatus according to the present invention with electrical portions shown in block form;

FIG. 1B is a cross-sectional view through line IB—IB in FIG. 1A,

FIG. 1C is a cross-sectional view through line IC—IC in FIG. 1B,

FIG. 2A is a longitudinal sectional view showing another embodiment of the invention, FIG. 2B is a cross-sectional view through line IIB—IIB in FIG. 2A.

FIGS. 1A through 1C illustrate a flow metering apparatus A1 which is constructed in accordance with the invention and is arranged to measure the velocity of fluid flowing in a pipe 10 by means of a vortex generation element 11 inserted in the stream of flowing fluid to produce Karman's vortices at a rate proportional to the velocity of the flowing fluid. Vortex generation element 11 has a rectangular cross-section whose depth $d$ in the direction of flow and height $h$ in the direction transverse to the flow have a $d/h$ ratio of 0.67 (or 2/3). At this ratio the vortices generated are best reinforced, as disclosed in the copending application of Yoshio Kurita, et al, Ser. No. 500,451, filed Aug. 26, 1974.

Figure 3A:
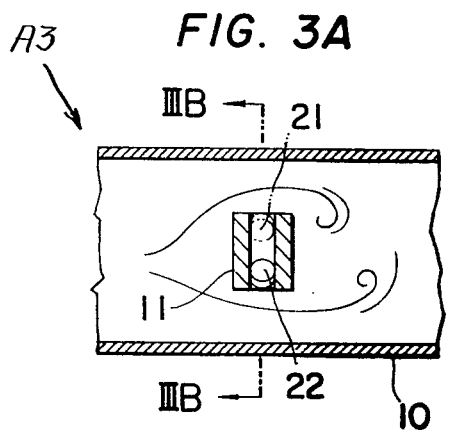
FIG. 3A is a longitudinal sectional view showing still another embodiment of the invention.

A passageway 12 extends transversely to the stream of fluid through the vortex generation element 11 to allow the measuring fluid to pass therethrough with an alternating fluid flow corresponding to the alternating shedding of vortices. As disclosed in the above-mentioned Kurita application, the ratio of the area A of the passageway opening ($A = 1 \times e$ as shown in FIG. 1C) to the area Ao of the rectangular side including the opening ($Ao = d \times D_1$ as shown in FIG. 1C) preferably has a value ranging from 0.3 to 1.0.

In accordance with the present invention, an ultrasonic generator 21 and an ultrasonic receiver 22 are housed in cases 23 mounted to the wall of the pipe 10 on opposite sides of element 11 and passageway 12 so that an ultrasonic signal transmitted from the ultrasonic generator 21 to the receiver 22 propagates through the passageway 12 of the vortex generation element 11 where it becomes modulated by the alternating flow therein. As oscillator circuit 30 drives the ultrasonic generator, an electronic circuit 40 amplifies the signal from the ultrasonic receiver 22, a demodulator 50 demodulates the modulated signal, and a counter 60 counts the variations in the demodulated signal caused by the alternating flow in passageway 12.

Operating the flow metering apparatus A1 is as follows: The ultrasonic generator 21 generates consecutive ultrasonic signals for propagation through the fluid being measured. These signals are directed nearly perpendicular to the stream of the measuring fluid, passed through the passageway 12, in alignment with the alternating flow therein, and consecutively received by the ultrasonic receiver 22.

When Karman's vortices are produced by the vortex generation element 11, the pressure on opposite sides of the vortex generation element changes and displaces the fluid in the passageway 12. The frequency of displacement accurately corresponds to the number of vortices generated. Assume that the velocity of the fluid displaced in the passageway in the arrow-marked direction '$a$' with the generation of vortices is $+u$ and the velocity thereof in the opposite direction '$b$' is $-u$. Then the time $\tau o$ required to propagate the ultrasonic signal across the pipe diameter separating the generator 21 and receiver 22 may be expressed as $$\tau o = \frac{D - h}{c} + \frac{h}{c \pm u}$$

$$= \frac{D}{c} + \frac{uh}{c^2} \qquad (1)$$

where
D = diameter of the pipe
c = sound velocity in the fluid
h = height of the vortex generation element The ultrasonic signal ER received by the ultrasonic receiver 22 is expressed by Eq. (2); and its phase lag $\Delta \phi$ by Eq. (3); as follows.

$$ER = D\sin \omega \left[ t - \frac{D}{c} \pm \frac{uh}{c^2} \right] \qquad (2)$$

$$\Delta \phi = \frac{u.h}{c^2} \qquad (3)$$

Equations (2) and (3) signify that the signal ER received by the ultrasonic receiver 22 is phase-modulated or frequency-modulated by the displacement of the fluid in the passageway 12. Accordingly, by using demodulator 50 and counter 60 to count how often the signal ER is phase- or frequency-modulated, the number of vortices generated can be detected and thus the flow velocity or flow rate of the fluid can be measured.

FIG. 2 illustrates another flow metering apparatus A2 constructed according to the invention and having a vortex generation element 11 with a circulator cross-section. An ultrasonic generator 21 and an ultrasonic receiver 22 are mounted directly upon the wall of the pipe 10 carrying the fluid being measured. Projections 71 and 72 are installed on the inner wall of the pipe 10 downstream from the vortex generation element 11 at positions distant from the center of the vortex generation element by 0.1D to 5D, where D is the internal diameter of the pipe. In this example, the projections 71 and 72 are 0.1D high (FIG. 2A).

The projections 71 and 72 are parallel to the vortex generation element (FIG. 2B), contribute to reinforcing and stabilizing the vortices produced thereby, and consequently improve the signal-to-noise ratio of the signal generated. More specifically, the streams shed from the vortex generation element 11 are interrupted by the projections 71 and 72 and thereafter are considerably restricted to flow along paths indicated by the solid lines $a_2$ and $b_2$ instead of the paths of dotted lines $a_1$ and $b_1$, which are the paths the streams would take without the projections 71 and 72. With these projections, therefore, the distance m between opposed vortices is reduced, causing the vortex generation frequency $f$ to be increased and thus enabling the device to offer a greater signal-to-noise ratio.

Figure 3B:
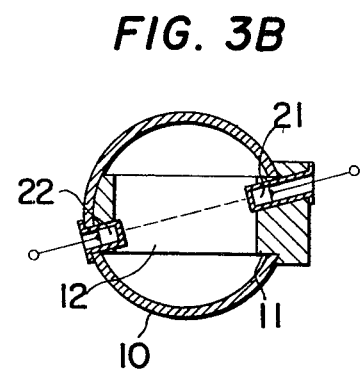
FIG. 3B is a cross-sectional view through line IIIB—IIIB in FIG. 3A.

FIG. 3 shows another flow metering apparatus A3 according to the invention wherein the vortex generation element 11 has a rectangular cross-section, an ultrasonic generator 21 is mounted on the top of the vortex generation element at one end thereof, and an ultrasonic receiver 22 is mounted on the bottom of the vortex generation element at the opposite end thereof. The ultrasonic signal generated is propagated through the passageway 12 along a diagonal path indicated by the dotted line in FIG. 3B. The device of this embodiment is advantageous in that the vortex generation element, the ultrasonic generator, and the ultrasonic receiver can concurrently be mounted on the pipe or dismounted therefrom.

Figure 4:
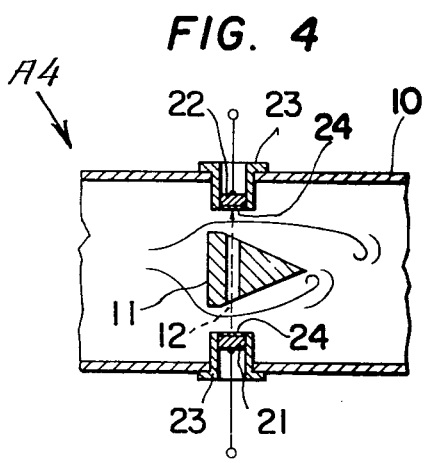
FIG. 4 is a longitudinal sectional view showing an additional embodiment of the invention.

FIG. 4 shows another flow metering apparatus A4 according to the invention wherein the vortex generation element 11 has a triangular cross-section, and the ultrasonic generator 21 and ultrasonic receiver 22 are housed internally of the pipe inner wall in cases 23, mounted on the pipe 10 by means of a flange, to permit the length of the ultrasonic signal transmission path to be reduced. The surface of the case 23 is coated with a layer 24 in the area in contact with the fluid to be measured.

Figure 5:
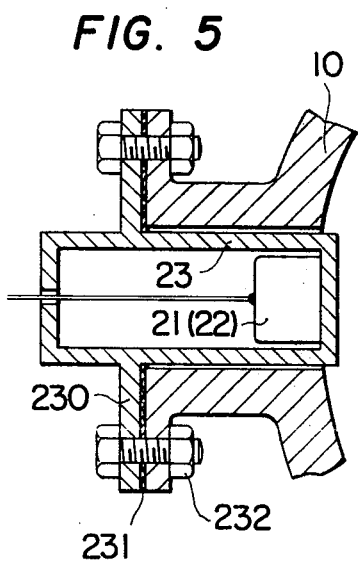
FIG. 5 is a detailed sectional view showing means for mounting the ultrasonic generator and the ultrasonic receiver to a pipe.
Figure 6A:
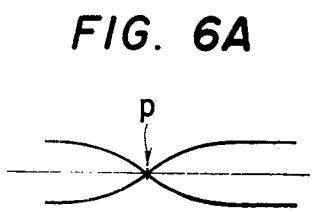
FIGS. 6A and 6B are diagrams showing waveforms useful for illustrating the operation and effects of the arrangement shown in FIG. 5.
Figure 6B:
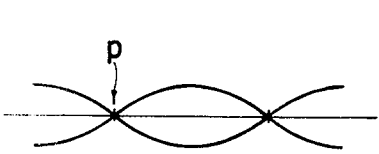

FIG. 5 shows an arrangement for mounting the cases 23 of the ultrasonic generator and ultrasonic receiver to the pipe 10 for increased sensitivity of detection. The case 23 is mounted to the pipe at a position corresponding to a node of vibration of the case. At this nodal position (as indicated by point P in FIGS. 6A and 6B), the case is formed with a mounting flange 230 by means of which the case 23 is mounted to the pipe and secured therein with a screw 232 and seal packing 231. In this construction, the vibration displacement of the case 23 becomes zero in the vicinity of its nodal point P, as apparent from FIGS. 6A and 6B, and the vibration of the ultrasonic generator is not transmitted to the pipe 10 by its mount. The ultrasonic generator thus can be more efficiently operated. Furthermore, this arrangement makes it unlikely for the ultrasonic receiver to pick up any noise signal from the pipe.

Figure 7:
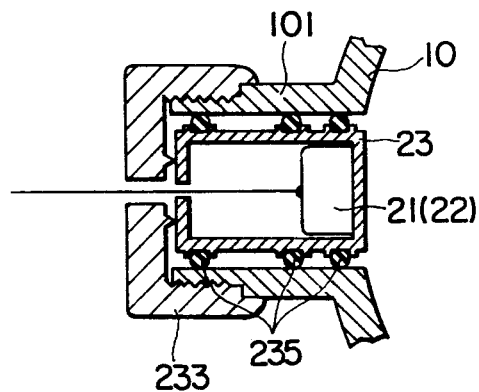
FIG. 7 is a detailed sectional view showing another means for mounting the ultrasonic generator and the ultrasonic receiver to a pipe.

FIG. 7 shows another arrangement for the cases 23 of the ultrasonic generator and ultrasonic receiver to the pipe. In this arrangement, the pipe 10 is fitted with a tubular support member 101, and the case 23 is cylindrical and is received within the tubular support member 101 and supported herein with O-rings 235 made of an elastic material such as rubber. A cap 233 joining with tubular support 101 fastens the case in position. In this construction, because the case 23 is supported by way of elastic O-rings, the case 23 is in contact with the support member in very small areas, with the result that the vibration of the case is not transmitted to the pipe, and a highly desirable acoustic shielding characteristic is attained.

Figure 8:
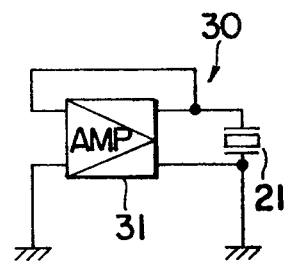
FIGS. 8 and 9 are block diagrams showing oscillators used to drive the ultrasonic generator.
Figure 9:
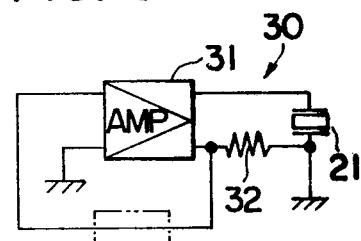

FIGS. 8 and 9 show examples of the square wave oscillator 30 depicted in FIG. 1A in block form and used to drive the ultrasonic generator 21. As shown in FIG. 8, the ultrasonic generator 21 is connected to the output terminal of an amplifier 31, and a voltage generated across the ultrasonic generator 21 is positively fed back to the input side of the amplifier 31 to form a self-oscillation circuit.

In the example shown in FIG. 9, an element 32 such as a resistance is connected in series with the ultrasonic generator 21. The current flowing through the ultrasonic generator 21 is detected by the element 32 and positively fed back to the input side of the amplifier 31 to form a self-oscillation circuit. In this circuit, the current flowing through the ultrasonic generator 21 increases in the vicinity of resonant frequency. This resonance point is securely detected even if the resonant frequency of the ultrasonic generator varies due to external causes such as temperature variations. Hence the circuit can be allowed to self-oscillate at a frequency equal to the resonant frequency, to drive the ultrasonic generator with high efficiency. As further shown in FIG. 9, a frequency selection circuit or filter 33 capable of passing the frequency range of the vibration mode of the ultrasonic generator may be inserted in the feedback circuit.

Figure 10:
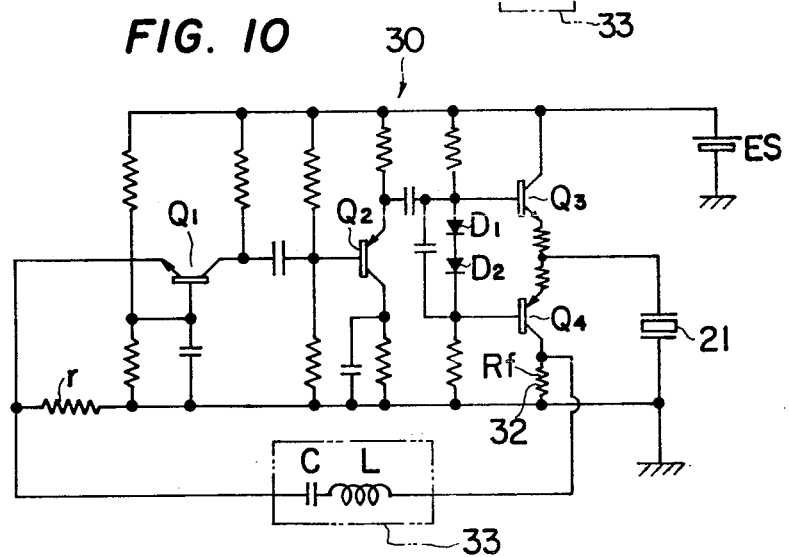
FIG. 10 is a circuit diagram showing a specific example of the oscillator of FIG. 9.

FIG. 10 illustrates a detailed circuit arrangement corresponding to the arrangement shown in block form in FIG. 9. In FIG. 10, the ultrasonic generator 21 is connected to an emitter circuit of transistors $Q_3$ and $Q_4$ in a single-ended push-pull circuit in which these transistors alternately turn on and off to make it possible to reduce their collector losses. Hence these transistors may be of small capacity with good high-frequency characteristics, thus permitting the circuit to offer a large output. A resistance element Rf is used to detect the current flowing through the ultrasonic generator. The voltage produced across this resistance element Rf is positively fed back to the input side of a grounded-base transistor $Q_1$ through the frequency selection or filter circuit 33.

As has been described above, the flow measuring device of the present invention utilizes the phenomenon that the ultrasonic signal transmitted from the ultrasonic generator is phase- or frequency-modulated by a fluid displacement which takes place in the passageway disposed in the vortex generation element. This flow velocity measuring device has numerous advantages:

1. the detection sensitivity is increased because the displacement of the fluid in the passageway (a) is free of turbulence and fluctuation in the stream due to other than vortices and (b) is coincident, i.e., aligned, with the path of ultrasonic signals transmitted for greater modulation;

2. the construction of the device is simple and sturdy owing to the absence of moving parts used;

3. measurements are unaffected by deposits of dust and mist contained in the fluid being measured;

4. the device easily can be constructed so as not to allow the ultrasonic generator and ultrasonic receiver to come in direct contact with the fluid being measured;

5. the electronic circuit used in the device is immune to noise and may be simple in construction because this electronic circuit is to simply count how often the signal received by the ultrasonic receiver is phase- or frequency-modulated.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

We claim:

1. Flow metering apparatus of the type having a vortex generation element with a generally elongate cylindrical shape placed transversely in a stream of fluid to produce on opposite sides of the element vortices which are shed in alternating fashion, and having means for measuring the frequency of vortex production to determine the velocity of the fluid stream, the flow metering apparatus being characterized in that:

the vortex generation element is formed with openings at said opposite sides which are connected together by passageway means through the interior of the element to produce therein an alternating fluid flow corresponding to the alternating shedding of vortices; and the vortex generating frequency measuring means includes an ultrasonic generator and an ultrasonic receiver mounted on opposite sides of the element to propagate an ultrasonic signal from the generator through the passageway means to the receiver to be modulated by the alternating fluid flow in the passageway means corresponding to the alternating shedding of vortices.

2. Flow metering apparatus as claimed in claim 1 wherein the vortex generation element is mounted transversely in a pipe carrying the stream of fluid, and wherein the ultrasonic generator and receiver are mounted on the pipe on opposite sides of the element.

3. Flow metering apparatus as claimed in claim 2 wherein the ultrasonic generator and receiver are mounted on the pipe so that the direction of ultrasonic signal propagation therebetween is aligned with the direction of alternating fluid flow in the passageway means.

4. Flow metering apparatus as claimed in claim 2 further comprising cases for housing the ultrasonic generator and receiver, and means for mounting the cases on the pipe.

5. Flow metering apparatus as claimed in claim 4 wherein said mounting means attaches to the cases in locations corresponding to the vibratory nodes of said cases, thereby reducing the transmission of vibrations between the pipe and said cases.

6. Flow metering apparatus as claimed in claim 5 wherein said mounting means comprises mounting flanges secured to said cases.

7. Flow metering apparatus as claimed in claim 4 wherein the mounting means comprises O-rings made of an elastic material supporting said cases.

8. Flow metering apparatus as claimed in claim 7 wherein said cases are cylindrical, and the mounting means further includes a cylindrical fitting attached to the pipe and arranged to receive the cylindrical cases with the O-rings therebetween.

9. Flow metering apparatus as claimed in claim 2 further comprising flow-deflecting projections mounted on the inner wall of said pipe downstream from the vortex generation element.

10. Flow metering apparatus as claimed in claim 9 wherein said projections are positioned parallel with the flow generation element to constrict flow through the pipe.

11. Flow metering apparatus as claimed in claim 9 wherein the pipe has an internal diameter $D$ and the projections are positioned downstream from the center of the vortex generation element a distance of $0.1D$ to $5D$.

12. Flow metering apparatus as claimed in claim 9 wherein the pipe has an internal diameter $D$ and said projections extend inwardly from the pipe inner wall a distance of approximately $0.1D$.

13. Flow metering apparatus as claimed in claim 1 wherein the vortex generation element is formed with a rectangular cross section, and the passageway means forms an opening of area A in the element surface which is related to the area Ao of the element rectangle side containing the opening with a ratio $A/Ao$ of between about 0.3 and 1.0.

14. Flow metering apparatus as claimed in claim 1 wherein said vortex generation element is formed with a rectangular cross section having a depth $d$ along the direction of fluid flow and a height $h$ across the direction of fluid flow which are in a ratio $d/h$ lying between about 0.5 and 0.9.

15. Flow metering apparatus as claimed in claim 1 wherein said vortex generation element is formed with a circular cross section.

16. Flow metering apparatus as claimed in claim 1 wherein the vortex generation element is formed with a triangular cross section.

17. Flow metering apparatus as claimed in claim 1 wherein the vortex frequency measuring means comprises a square wave oscillator for driving the ultrasonic generator, the oscillator having means for detecting the current flowing through the ultrasonic generator and for positively feeding back the detected signal to provide self-oscillation.

18. Flow metering apparatus as claimed in claim 17 further comprising a frequency selection circuit for controlling the frequency of the signal positively fed back and thereby controlling the oscillator frequency.

19. Flow metering apparatus as claimed in claim 1 wherein the ultrasonic generator and receiver are each mounted on the vortex generation element.

20. Flow metering apparatus as claimed in claim 19 wherein the ultrasonic generator and ultrasonic receiver are mounted at opposite sides and opposite ends of the vortex generation element to propagate an ultrasonic signal diagonally through said passageway means.

21. A flow velocity measuring device comprising:
a vortex generation element inserted in a pipe carrying a fluid to be measured and having a rectangular cross-section, the vortex generation element comprising passageway means communicating between opposite sides of the element to allow the fluid to pass therethrough, and the ratio of the area A of the passageway opening to the area Ao of the side of the vortex generation means including said opening being equal to or larger than 0.3 but smaller than 1.0;
an ultrasonic generator and an ultrasonic receiver housed in cases which are mounted to said pipe by means of O-rings made of an elastic material and positioned so that the ultrasonic signal from said ultrasonic generator propagates through said passageway to said ultrasonic receiver;
an oscillator for driving said ultrasonic generator; and
a demodulation circuit for detecting how often the signal received by said ultrasonic receiver is phase-modulated by fluid flowing through the passageway means.

* * * * *